Patented Dec. 11, 1934

1,983,588

UNITED STATES PATENT OFFICE 1,983,588

MANUFACTURE OF TRIARYL PHOSPHATES

Howard Adler and Hans Billroth Gottlieb, Chicago Heights, Ill., assignors to Victor Chemical Works, a corporation of Illinois No Drawing. Application November 23, 1932 Serial No. 644,136

7 Claims. (Cl. 260—99.20)

This invention relates to an improved method of producing triaryl phosphates.

In previous practice, triaryl phosphates, such as tricresyl phosphate and triphenyl phosphate have been prepared from phosphorous oxychloride ($POCl_3$) and a phenol.

By means of this invention the aryl phosphates are prepared from phosphorus pentoxide ($P_2O_5$), phosphorus pentachloride ($PCl_5$), and a phenol, such as cresol or phenol. In carrying out the reaction, the reagents may be brought together in a number of different combinations, whereby wholly different intermediate products are produced, and the reactions of which follow entirely different courses.

Regardless of the sequence of steps, the reacting proportions are 3 mols of phosphorus pentachloride, 1 mol phosphorus pentoxide and 15 mols of the phenol. All of the chlorine is recovered as hydrogen chloride.

1. In the preferred method, 15 mols of a phenol is gradually run upon 3 mols of phosphorus pentachloride, preferably at a temperature below 90° C. The phenol is in excess at this point, and a homogeneous oil is produced comprising mainly the diaryloxy phosphorus trichloride.

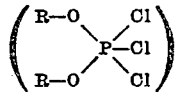

(where "R" represents an aryl radical), dissolved in the excess of the phenol. The oil is then run into another container containing 1 mol of phosphorus pentoxide, and the mixture then caused to react to form the triaryl phosphate. This reaction may be produced by heating the mass to 210–215° C. for about three hours without a catalyst, or by heating it to approximately 150° C. for two and one-half to three hours with anhydrous aluminum chloride ($Al_2Cl_6$), while agitating thoroughly. In general, 6 parts of aluminum chloride are employed for each 200 parts of phosphorus pentachloride. Other similar catalysts such as calcium chloride or magnesium chloride may likewise be employed, if desired.

For example, 250 parts of phosphorus pentachloride was placed in a flask fitted with a reflux condenser thermometer and dropping funnel. 719 parts of cresylic acid was added through the funnel at such rate as to keep the temperature below 90° C. The homogeneous oil produced was run into another container likewise fitted with a reflux condenser in which 57 parts of phosphorus pentoxide had been placed. The whole was heated quickly to 160° C., causing the pentoxide to dissolve. The mixture was kept at 160° C. until the hydrogen chloride which was evolved was coming off slowly, and it was then heated quickly to 210° C. and maintained at this temperature for two and one-half to three hours. The evolution of hydrogen chloride had ceased before the end of this period. The mass was cooled to 35° C. and was then run into 3% sodium hydroxide solution and agitated for about fifteen minutes, following which it was well washed until neutral to litmus, and separated from the water. The tricresyl phosphate was then distilled from the oil at 2 m. m. s. pressure, at a temperature between 248 and 263° C. The product was limpid, almost colorless, and contained no chlorine. A yield of 89.4% was obtained.

The same procedure may be carried out with 6 parts of anhydrous aluminum chloride, added after all of the ingredients had been mixed. In this case the temperature is raised to 140° instead of 160° and then to 150° instead of 210°, and the mixture thoroughly agitated during the heating.

2. 1 mol of the phosphorus pentoxide and 3 mols of the pentachloride may be mixed without heating, and 15 mols of a phenol gradually added, for example, over a period of about one hour. The addition raises the temperature to about 107–110° C., and the solids go into solution. Unless the addition is made slowly, the streams of hydrogen chloride produced may carry away the volatile constituents. Instead of adding the phenol to the phosphorus pentachloride and pentoxide, the latter may be added simultaneously to the first. In either event after mixture, the triaryl phosphates are produced by heating the mixture to the reaction temperature.

3. 1 mol. of phosphorus pentoxide may be added to 15 mols of a phenol. In order to do this, the temperature should be raised, in the case of phenol itself, for example, to 170–180° C. The temperature should then be reduced to approximately 100° C. or lower, prior to the addition of the phosphorous pentachloride. The phosphorus pentachloride is then added and the temperature raised to 210–220° C. without a catalyst, or 140–150° C. with a catalyst.

In following this procedure, a reaction takes an entirely different course. The result of the reaction of the phosphorus pentoxide and the phenol is to produce monoaryl phosphoric acid

and diaryl phosphorus acid

These intermediate products then react with the phosphorus pentachloride to produce their respective chlorides, and these in turn react with the excess phenol to form triaryl phosphate.

4. The reaction may likewise be carried out by adding 1 mol of phosphorus pentoxide to 15 mols of a phenol. Phosphorus pentachloride is then added gradually at 100° C., without previous solution of the pentoxide. The phenol and pentachloride react, the pentoxide going into solution at the same time. As a result, a homogeneous oil is produced which may be heated to 210° C. to produce the triaryl phosphate.

5. Likewise, 3 mols of phosphorus pentachloride and 9 mols of a phenol may be reacted to produce the triaryloxy phosphorus dichloride

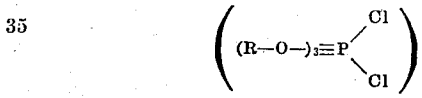

This product is then caused to react with 1 mol of phosphorus pentoxide and the remaining 6 mols of the phenol, to produce the triaryl phosphate.

The process is applicable to phenols as a class, and particularly to cresol, phenol and xylenol, and their derivatives.

The foregoing detailed description has been given for clearness of understanding only, and no unnecessary limitations should be understood therefrom, but the appended claims should be construed as broadly as permissible, in view of the prior art.

We claim:

1. The process of producing triaryl phosphates from phosphorus pentachloride, phosphorus pentoxide and a monohydric phenol characterized by first reacting the phenol with one of the phosphorus compounds.

2. The process as set forth in claim 1 in which the first reaction is between the monohydric phenol and the phosphorus pentoxide.

3. The method as set forth in claim 1, in which the first reaction is between the monohydric phenol and the phosphorus pentachloride.

4. The process of producing triaryl phosphates which comprises reacting a monohydric phenol and phosphorus pentachloride to produce a solution comprising an aryloxy phosphorus chloride, and then reacting said solution with phosphorus pentoxide to produce a triaryl phosphate.

5. The method of producing triaryl phosphates which comprises mixing phosphorus pentoxide and phosphorus pentachloride without reaction, and then gradually adding a monohydric phenol to said reaction mixture and reacting the same to form a triaryl phosphate.

6. The method of producing triaryl phosphates which comprises mixing phosphorus pentoxide and a monohydric phenol without substantial reaction and gradually adding phosphorus pentachloride thereto, and reacting the mixture to form a triaryl phosphate.

7. The method as set forth in claim 1, in which the phenol is cresol.

HOWARD ADLER.
H. BILLROTH GOTTLIEB.